US008477719B2

(12) United States Patent
Ho

(10) Patent No.: US 8,477,719 B2
(45) Date of Patent: Jul. 2, 2013

(54) SYSTEMS AND METHODS FOR IN-ORDER DELIVERY IN DOWNLINK DURING HANDOVER

(75) Inventor: Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 673 days.

(21) Appl. No.: 12/240,142

(22) Filed: Sep. 29, 2008

(65) Prior Publication Data

US 2009/0086677 A1 Apr. 2, 2009

Related U.S. Application Data

(60) Provisional application No. 60/976,769, filed on Oct. 1, 2007.

(51) Int. Cl.
*H04Q 7/00* (2006.01)
(52) U.S. Cl.
USPC .......................................... 370/331; 370/338
(58) Field of Classification Search
USPC .. 370/328, 331, 338, 389, 392, 394; 455/436, 455/437, 438, 439, 442, 443, 444
See application file for complete search history.

(56) References Cited

U.S. PATENT DOCUMENTS

| 7,327,734 | B2* | 2/2008 | Yi et al. ........................ 370/394 |
| 7,430,206 | B2* | 9/2008 | Terry et al. .................... 370/394 |
| 2005/0094586 | A1* | 5/2005 | Zhang et al. .................. 370/310 |
| 2005/0238016 | A1 | 10/2005 | Nishibayashi et al. | |

(Continued)

FOREIGN PATENT DOCUMENTS

| CN | 1396782 A | 2/2003 |
| CN | 1437368 A | 8/2003 |

(Continued)

OTHER PUBLICATIONS

3GPP TSG RAN: "3rd Generation Partnership Project; Technical Specification Group Radio Access Network; Evolved Universal Terrestrial Radio Access (E-UTRA) Packet Data Convergence Protocol (PDCP) specification (Release 8); 3GPP TS 36.323 V1.0.0"[Online] Sep. 24, 2007, pp. 1-19, XP002513707 Retrieved from the Internet: URL:http://www.3gpp.org/ftp/Specs/html-i nf 0/36323.htm> [retrieved on Feb. 5, 2009] * sections 4.2 to 7.4 *.

(Continued)

*Primary Examiner* — Ricky Ngo
*Assistant Examiner* — Christine Ng
(74) *Attorney, Agent, or Firm* — Liem T. Do

(57) ABSTRACT

Systems and methods that manage effects of discarded SDUs during handover. Aspects of the subject innovation maintain order for arrival of PDCP SDUs when a UE encounters a lost PDCP, which has resulted from a dropped SDU at the source eNB—before assignment of an associated PDCP SN. By initially assigning all SDUs corresponding PDCP SNs, a PDCP SN gap or hole can then be encountered upon dropping of a PDCP SDU. To manage PDCP SN gaps or holes thus generated, an internal time out can be designated to terminate an associated UE's delay for such SN hole(s) via a time out. Other aspects enable the source eNB to send a PDCP Status Message to the UE (via the target eNB) to abort the SN gaps or holes resulting from a dropped PDCP SN.

35 Claims, 11 Drawing Sheets

U.S. PATENT DOCUMENTS

| | | | |
|---|---|---|---|
| 2007/0291788 A1* | 12/2007 | Sammour et al. | 370/466 |
| 2008/0010677 A1* | 1/2008 | Kashima et al. | 726/12 |
| 2008/0240107 A1* | 10/2008 | Parekh et al. | 370/394 |
| 2008/0310367 A1* | 12/2008 | Meylan | 370/331 |
| 2008/0310368 A1* | 12/2008 | Fischer | 370/331 |
| 2009/0003283 A1* | 1/2009 | Meylan | 370/331 |
| 2009/0124259 A1* | 5/2009 | Attar et al. | 455/436 |
| 2010/0177739 A1* | 7/2010 | Huang | 370/331 |

FOREIGN PATENT DOCUMENTS

| | | |
|---|---|---|
| CN | 1829187 A | 9/2006 |
| EP | 1276293 A2 | 1/2003 |
| JP | 2003018207 A | 1/2003 |
| JP | 2003111148 A | 4/2003 |
| JP | 2004179917 A | 6/2004 |
| JP | 2004282197 A | 10/2004 |
| JP | 2006246539 A | 9/2006 |
| KR | 20030005537 A | 1/2003 |

OTHER PUBLICATIONS

Fujitsu: "Handling PDCP Sequence Numbering during Handover" 3GPP Draft; R3-071606, 3RD Generation Partnership Project (3GPP), Mobile Competence Centre ; 650, Route Des Lucioles ; F-06921 Sophia-Antipolis Cedex ; France, vol. tsg_ranWG3_luTSGR3_57docs, no. Athens, Greece; 20070820, Aug. 15, 2007, XP050162416 the whole document.

Nokia et al: "Using GTP-U header fields for PDCP SN forwarding on X2 and SI interface" 3GPP Draft; R3-071574, 3RD Generation Partnership Project.

"Downlink data forwarding for mobility" 3GPP Draft; R3-071367, 3rd Generation Partnership Project (3GPP), Mobile Competence Centre ; 650, Route Des Lucioles ; F-06921 Sophia-Antipolis Cedex ; France, vol. tsg_ranWG3_luTSGR3_57docs, no. Athens, Greece; 20070820, Aug. 15, 2007, XP050162202 paragraph [002.].

Ericsson, "PDCP SN Handling at Data Forwarding," R3-071500, 3GPP TSG-RAN WG3 #57, Athens, Greece, Aug. 20-24, 2007.

Ericsson, "Downlink Reordering at Intra-LTE Mobility," R3-071506, 3GPP TSG-RAN WG3 #57, Athens, Greece, Aug. 20-24, 2007.

International Search Report and the Written Opinion—PCT/US2008/078367, International Search Authority—European Patent Office—Feb. 18, 2009.

NEC, "The DL Data forwarding," R3-071337, 3GPP RAN Working Group 3 meeting #57, Athens, Greece, Aug. 20-24, 2007.

Nokia et al: "Using GTP-U header fields for PDCP SN forwarding on X2 and SI interface" 3GPP Draft; R3-071574, 3RD Generation Partnership Project (3GPP), Mobile Competence Centre ; 650, Route Des Lucioles ; F-06921 Sophia-Antipolis Cedex ; France, vol. tsg_ranWG3_luTSGR3_57docs, no. Athens, Greece; 20070820, Aug. 15, 2007, XP050162390 the whole document.

* cited by examiner

SYSTEMS AND METHODS FOR IN-ORDER DELIVERY IN DOWNLINK DURING HANDOVER

CLAIM OF PRIORITY UNDER 35 U.S.C. §119

The present Application for Patent claims priority to Provisional Application No. 60/976,769 entitled "IN-ORDER DELIVERY IN DOWNLINK DURING LTE HANDOVER" filed on Oct. 1, 2007 and assigned to the assignee hereof and hereby expressly incorporated by reference herein.

BACKGROUND

1. Field

The present description pertains to managing effects of discarded service data units (SDUs) during handover, and maintaining order of arrival of Packet Data Convergence Protocol (PDCP) SDUs when a UE encounters a lost PDCP.

2. Background

Wireless communication systems are widely deployed to provide various types of communication content such as voice, data, and the like. Such systems can be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

The General Packet Radio Services (GPRS) system is a ubiquitous mobile phone system is used by GSM Mobile phones for transmitting IP packets. The GPRS Core Network (an integrated part of the GSM core network) is a part of the GPRS system that provides support for WCDMA based 3G networks. The GPRS Core Network can provide mobility management, session management and transport for Internet Protocol packet services in GSM and WCDMA networks.

GPRS Tunneling Protocol (GTP) is an IP protocol of the GPRS core network. GTP can enable end users of a GSM or WCDMA network to move from place to place while continuing to connect to the Internet as if from one location at a particular Gateway GPRS Support Node (GGSN). Such is accomplished by carrying subscriber's data from a subscriber's current Serving GPRS Support Node (SGSN) to the GGSN that is handling the subscriber's session. Three forms of GTP are used by the GPRS core network including (1) GTP-U: for transfer of user data in separated tunnels for each PDP context; (2) GTP-C: for control reasons such as setup and deletion of PDP contexts and verification of GSN reachability updates as subscribers move from one SGSN to another; and (3) GTP' for transfer of charging data from GSNs to the charging function.

GPRS Support Nodes (GSN) are network nodes that support the use of GPRS in the GSM core network. There are two key variants of the GSN including Gateway GPRS Support Node (GGSN) and Serving GPRS Support Node (SGSN).

A GGSN can provide an interface between the GPRS backbone network and the external packet data networks (radio network and the IP network). It can convert GPRS packets coming from the SGSN into the appropriate packet data protocol (PDP) format (e.g. IP or X.25) and send the converted packets them to the corresponding packet data network. In the other direction, PDP addresses of incoming data packets may be converted to the GSM address of a destination user. The readdressed packets can then be sent to the responsible SGSN. For this purpose, the GGSN can store the current SGSN address of the user and his or her profile in its location register. The GGSN can provide IP address assignment and is generally the default router for a particular UE.

In contrast, an SGSN can be responsible for the delivery of data packets from/to mobile stations within its geographical service area. The tasks of an SGSN can include packet routing and transfer, mobility management, logical link management, authentication and charging functions.

Moreover, the GPRS tunneling protocol for the user plane (GTP-U) layer may be used on the user-plane (U-plane) and is useful for transmitting user data in a packet switched area. Packet switched networks in the Universal Mobile Telecommunications System (UMTS) are based on GPRS, and therefore, the GTP-U may also be used in the UMTS. UMTS is one of the third-generation (3G) cell phone technologies. UMTS is sometimes referred to as 3GSM, which hints at both its 3G background and the GSM standard for which it was designed to succeed.

3GPP Long-term evolution (LTE) complements the success of High Speed Packet Access (HSPA) with higher peak data rates, lower latency and an enhanced broadband experience in high-demand areas. This is accomplished with the use of wider-spectrum bandwidths, Orthogonal Frequency-Division Multiple Access (OFDMA) and SC-FDMA (i.e., single carrier) air interfaces, and advanced antenna techniques. Such techniques enable high spectral efficiency and an excellent user experience for a wide range of converged IP services. UMTS operators are rapidly adopting and offering IP services such as rich multimedia (e.g., video-on-demand, music download, video sharing), VoIP, PTT and broadband access to laptops and PDAs. Operators offer these services through access networks such as HSPA, HSPA+ and LTE.

It should be appreciated that there will be instances where a one Node-B (or more appropriately for these particular telecom standards "eNB") will hand communication off to a second eNB. For the purpose of this disclosure, the eNB losing communication with a UE may be referred to as the "source eNB" while the eNB gaining access to the UE may be referred to as the "target eNB."

For Long Term Evolution (LTE) communication systems, it can be beneficial to guarantee that downlink Radio Link Control (RLC) service data units (SDUs) are delivered "in-order" during handover. LTE communications systems, such as UMTS) can use PDCP as one of the layers of the Radio Traffic Stack. PDCP can perform a variety of functions including IP header compression and decompression, transfer of user data and maintenance of sequence numbers (SNs).

During handover, a target eNB may receive packets from two sources including an X2 source (e.g., from another eNB, such as the source eNB) and an S1 source (e.g., from a node of the supporting communications backbone). During handover, the target eNB can assign the PDCP sequence number (PDCP-SN) to those packets correctly to ensure they are delivered in-order at the UE—advantageously with only a minimum DL data delay.

In LTE, the relevant specifications promote that PDCP SDUs be delivered in-order to the upper layer above PDCP if so configured. As such, PDCP SDUs should typically be delivered to the layer above PDCP in the same order they arrive at the Serving Gateway (for DL) or the UE (for UL. The current baseline solution in RAN3 (i.e., TSG RAN working group 3) for handover is that during handover, the source eNB can provide the "next PDCP SN to use" to the target eNB. After that, the source eNB may freeze the PDCP SN, not assign any new PDCP SN to the SDUs, and forward all those SDUs to the target eNB without a PDCP SN. For all the SDUs that have a PDCP SN, the source eNB may try to send them to the UE and if not successful, forward those to the target eNB (unciphered) with the PDCP SN attached.

In various system arrangements, the target eNB may receive two SDU streams—one from the source eNB (via the X2 interface) and the other one from the SGW (via a new S1 interface). To ensure in-order delivery, the target may need to assign the "next PDCP SN to use" (N) to the first forwarded PDCP SDU without a SN. Since the target eNB does not know if such SDUs even exist, the target eNB may have to wait for up to some predetermined time limit. If no SDUs arrive from the source eNB after the predetermined time limit has past, the target eNB may assign N to the first PDCP SDU coming from the SGW. If there are SDUs coming from the source eNB, the target eNB may serve those first before serving the SDUs from the new S1. At some point, if there are no more SDUs coming from the source eNB, the target will start to serve the SDUs from the new S1. Any forwarded SDUs after that may be discarded or transmitted to the UE as well.

The problems with the RAN3 proposed baseline solution are numerous. For example, if the predetermined time limit is set too long, there is unnecessary waiting (fixed delay all the time). On the other hand, if the predetermined time limit is set too short, any SDUs arriving after the predetermined time limit expires will be either transmitted to the UE intermixed with the SDUs from the new S1 (SDU out-of-order delivery); or discarded (bad for TCP/IP). Further, since the optimum timer value will depend on a lot of factors (e.g., backhaul load), it may be hard to use a fixed value.

In addition, since the target can be holding the SDUs coming from the new S1 (until it is sure no more SDUs are being forwarded from the source eNB), the target eNB may be under utilizing the over-the-air bandwidth when related the predetermined time limit timer is active. Moreover, the SDUs can receive data out-of-order within S1 and X2, regardless of handover.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with managing effects of discarded service data units (SDUs) during hand over and providing a smooth transition from one cell to another cell. Various aspects of the subject innovation facilitate maintaining order for arrival of Packet Data Convergence Protocol (PDCP) SDUs when a UE encounters a lost PDCP that has resulted from a dropped SDU at the source eNB—before assignment of a PDCP SN.

In one aspect, SDUs can be initially assigned their corresponding PDCP SNs, to facilitate detection of a gap or hole within the PDCP SN as a result of dropping a PDCP SDU. Moreover, to manage PDCP SN gaps or holes thus generated, an internal time out can be designated, wherein an associated UE waits for such SN hole(s) to time out. Other aspects enable the source eNB to send a PDCP Status Message to the UE (via the target eNB) to abort the SN gaps or holes resulting from a dropped PDCP SN. Accordingly, the uniqueness of sequence numbers assigned by the serving gateway to the packets can be exploited, to mitigate risk of offset changes related to a dropped SDU at the source eNB.

According to related aspects, a method for managing PDCP SN gaps or holes is provided. The method includes detecting a missing PDCP sequence number followed by assigning a time out period for receiving such missing PDCP sequence number. Moreover the source eNB can send a PDCP Status Message to the UE (via the target eNB) to abort the SN gaps or holes resulting from such dropped PDCP SN.

Another aspect relates to a wireless communication apparatus. The wireless communications apparatus can include at least one processor configured to detect a gap or hole PDCP SN. The at least one processor is further configured to generate an internal time out period, wherein an associated UE can wait for such SN hole(s) to time out. The at least one processor can further be configured to enable the source eNB to send a PDCP Status Message to the UE (via the target eNB), and abort the SN gaps or holes resulting from a dropped PDCP SN.

Still another aspect relates to a computer program product, which can have a computer-readable medium having a code for causing at least one computer to detect a gap or hole in PDCP SN. Upon detecting such gap in sequence numbers, the computer program product can generate an internal time out, wherein an associated UE can waits for such SN hole(s) to time out. The computer program product can further include a code for causing the source eNB to send a PDCP Status Message to the UE (via the target eNB), and abort the SN gaps or holes resulting from a dropped PDCP SN.

Accordingly, by tying the PDCP SN (which are employed in the source/target eNB), to the GTP-U SN on the S1's, the SN offset between the PDCP SN and GTP-U SN can be indicated to the target eNB by the source eNB. Moreover, should any PDCP packets be discarded during HO, then the corresponding dropped PDCP SN is also indicated to the target eNB. Such facilitates satisfying a requirement for the eNB to accurately assign PDCP sequence numbers to packets correctly, and ensure sequential delivery at the UE. Moreover, DL data delay time can be reduced.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
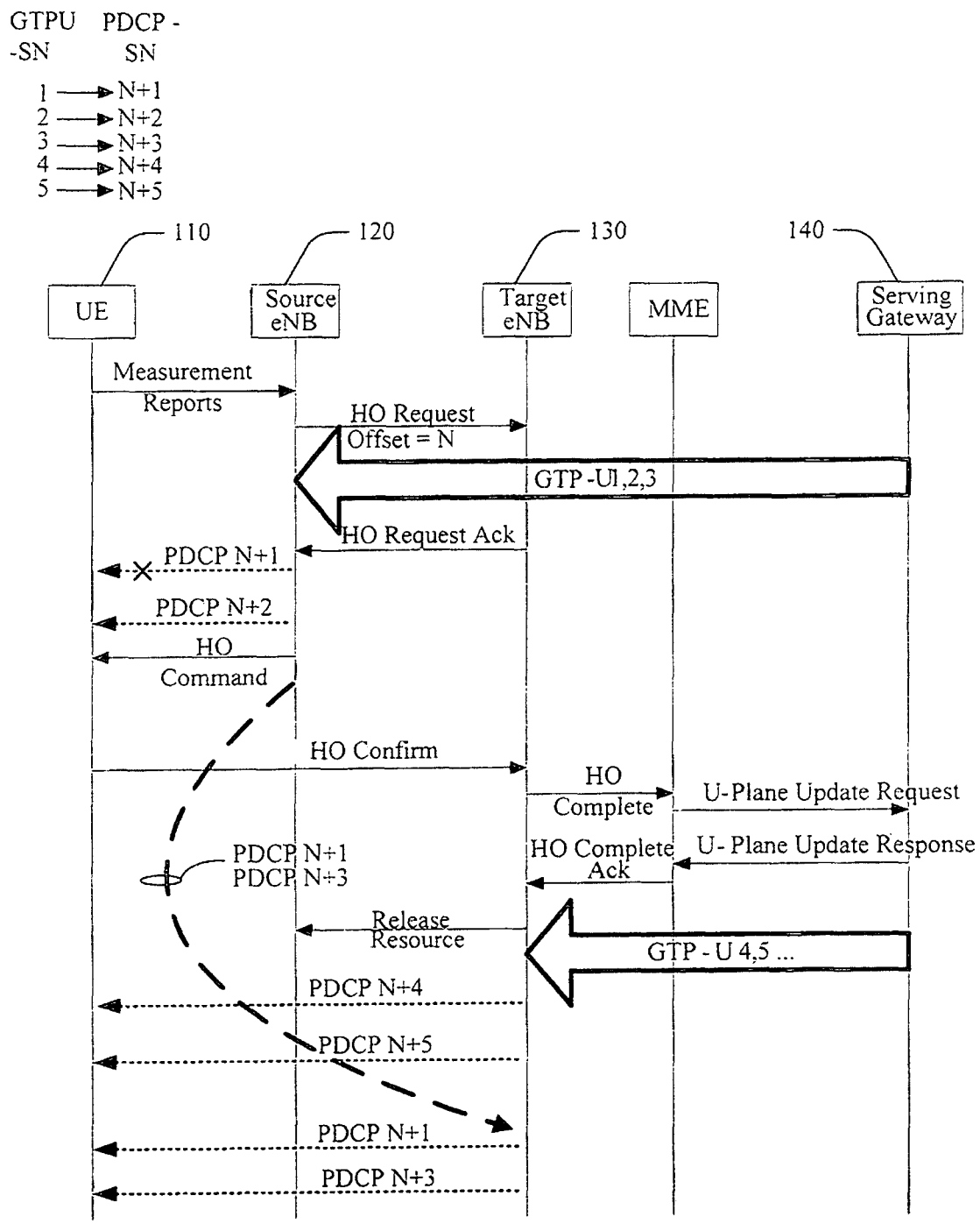
FIG. 1 illustrates an exemplary flow of events for a handover that implements various aspects.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, S-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2).

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 illustrates an exemplary flow of events for a handover that implements various aspects of the subject innovation and facilitates understanding thereof. As illustrated in FIG. 1, initially the UE 110 reports the measurement of source eNB 120 and signal strength to such source node. If the source eNB 120 determines to perform a handover to the target eNB 130, a handover request is sent from the source eNB to the target eNB 130. The source eNB 120 can then indicate offset numbers (N) in the handover request. As such, the source eNB 120 can apply an offset N (where N is an integer) to the sequence number of the serving gateway 140, wherein the source applies a PDCP sequence number having such offset N. Likewise, the serving gateway 140 can designate the sequence number of the packets arriving from the serving gateway by assigning unique numbers, as GTP-USN.

Put differently, the source eNB 120 can apply a PDCP sequence number with an offset N and supply PDCP packets N+1, N+2, N+3, N+4, N+5 and the like—wherein a constant mapping (offset by N) occurs between the GTP-U SN and the PDCP SN. Upon occurrence of the hand over, the UE 110 can send a handover confirm to the target eNB 130; and attempt to open a new connection to the serving gateway 140. In the meantime, the source eNB 120 will forward PDCP sequence numbers that are received, to the target eNB 130. After such hand over has occurred the serving gateway 140 continues sending the packets with the sequence numbers (e.g., the next sequence numbers 4 and 5.) Upon the target eNB receiving such packets the target will also add an offset N as previously designated by the source eNB 120. As such when the target eNB 130 sends a packet, the offset N can be added thereto, to obtain the correct PDCP sequence number. Moreover, when the target eNB 130 obtains packets after the handover from the serving gateway 140, the target eNB 130 can send PDCP associated therewith (e.g., PDCP N+4, N+5) over the air to the UE. Before such packets arrive at the target eNB 130, the PDCP N+1 and PDCP N+3, packets can be sent to the UE that is aware of how to order them and hence the target eNB 130 and the source eNB 120 can be synchronized (e.g., the target eNB 130 is aware of what offset to employ.)

During such flow of events, and absent aspects of the subject innovation, if a PDCP is lost (e.g., PDCP N+1) and the UE 110 never receives such packet, the PDCP SN offset from the target eNB 130 to the UE 110 is at risk of being changed. For example, when an SDU is dropped at the source eNB 130 (e.g., becomes stale in the buffer) before it has a chance to obtain a PDCP SN, the offset will change. For example, before source eNB assigns PDCP number if packet is dropped at the source eNB; and hence a hole or gap is generated from packets forwarded by the target eNB to the UE. Accordingly, because of the order of delivery requirement—absent aspects of the subject innovation, the UE 110 cannot deliver any further packets after N+1; because such UE is awaiting an N+2 that will never arrive as it is never scheduled to be transmitted (e.g., the UE 110 receives N+3 and the N+4—as the N+2 packet is being dropped by the eNodeB 120).

Figure 2:
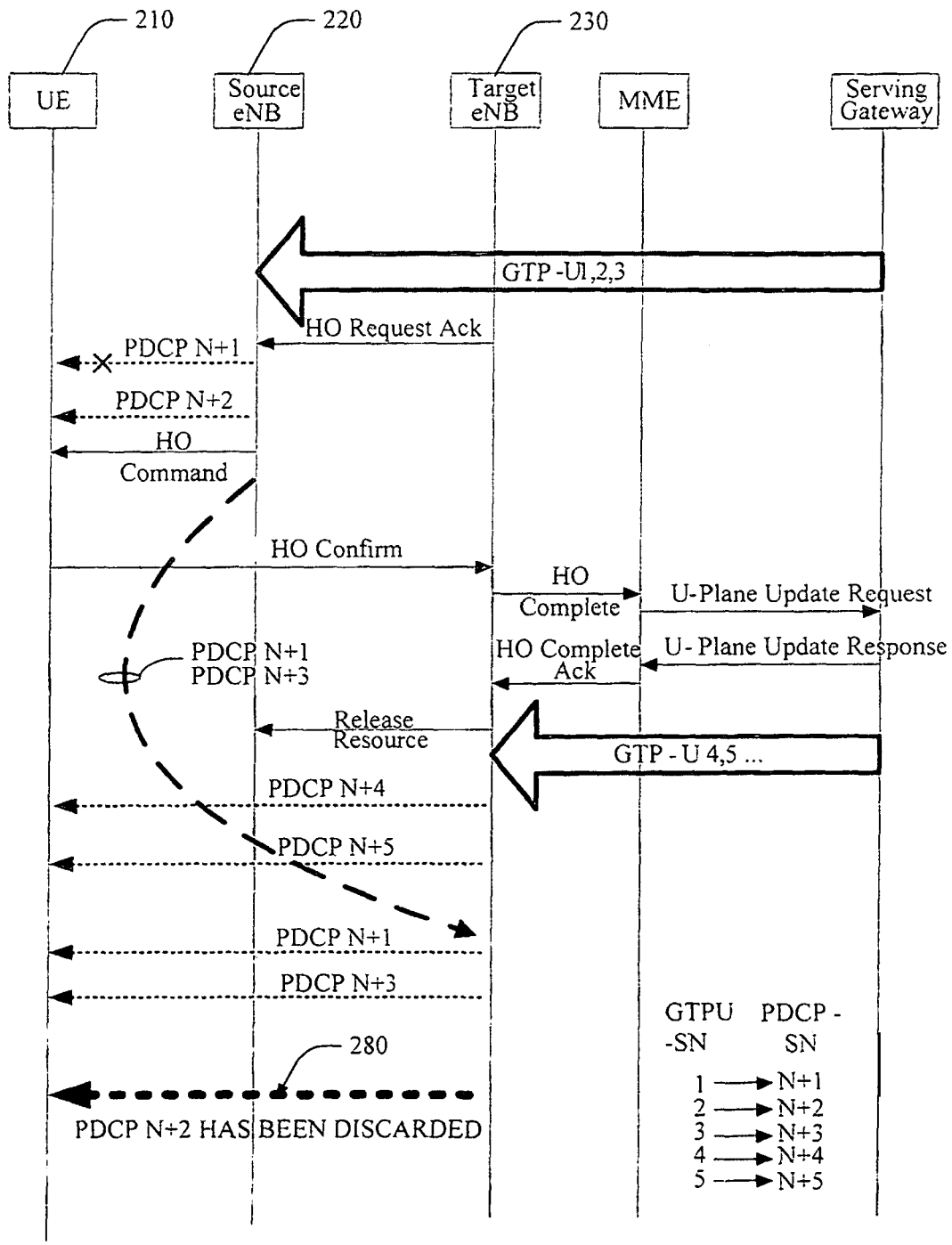
FIG. 2 illustrates an internal time out associated with removing a Packet Data Convergence Protocol (PDCP) sequence gap for a UE.
Figure 3:
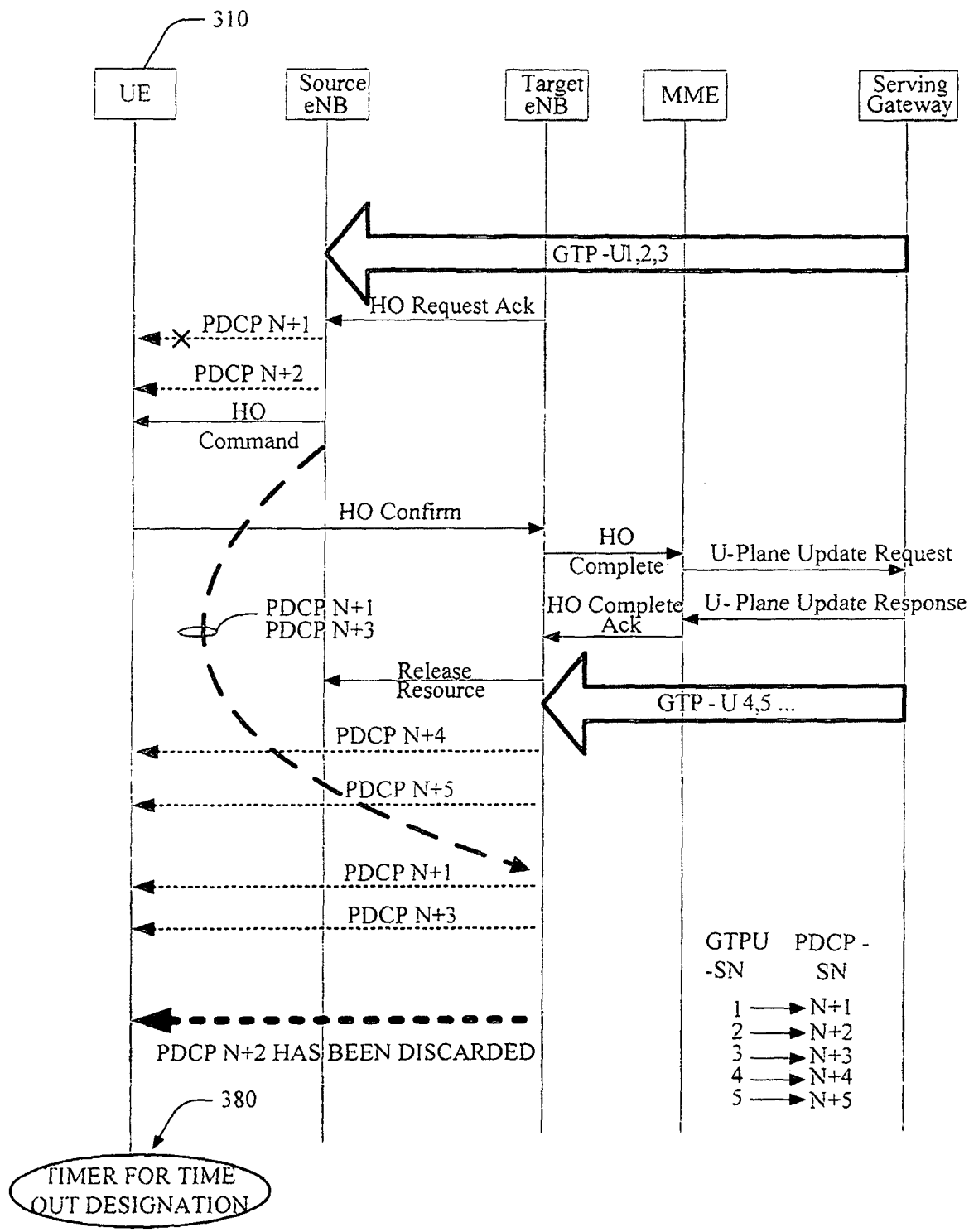
FIG. 3 illustrates a further flow of events for removal of a hole or gap created in PDCP SN by sending PDCP status message according to a further aspect.

FIG. 2 illustrates an aspect wherein the target eNB 230 can inform the UE 210 regarding the discarded PDCP. For example, as illustrated in FIG. 2 the target eNB 230 successfully transmits PDCP N+1, PDCP N+3, PDCP N+4, PDCP N+5 to the UE 210. As explained earlier, PDCP N+2 is missing from such sequence due to an earlier drop of an associated packet and discarded SDU at the source eNB 220. The notification 280 from the target eNB 230 informs the UE 210 that PDCP N+2 has been discarded. Likewise, FIG. 3 illustrates a related aspect for notifying the UE 310 regarding elimination for the PDCP N+2, which includes a timer and a time out period. Such time out period designation 380 can designate an amount of time that the UE 310 awaits receipt of the PDCP N+2 after which, the UE 310 proceeds with the order of delivery requirements for delivery of the packets. Accordingly, when assigning all SDUs a PDCP SN—the uniqueness of sequence numbers assigned by the serving gateway to the packets can be exploited, and risk of offset changes related to a dropped SDU at the source eNB are managed efficiently. Such further maintains order for arrival for PDCP SDUs when a UE encounters a lost PDCP that has resulted from a dropped SDU at the source eNB—before assignment of a PDCP SN.

Figure 4:
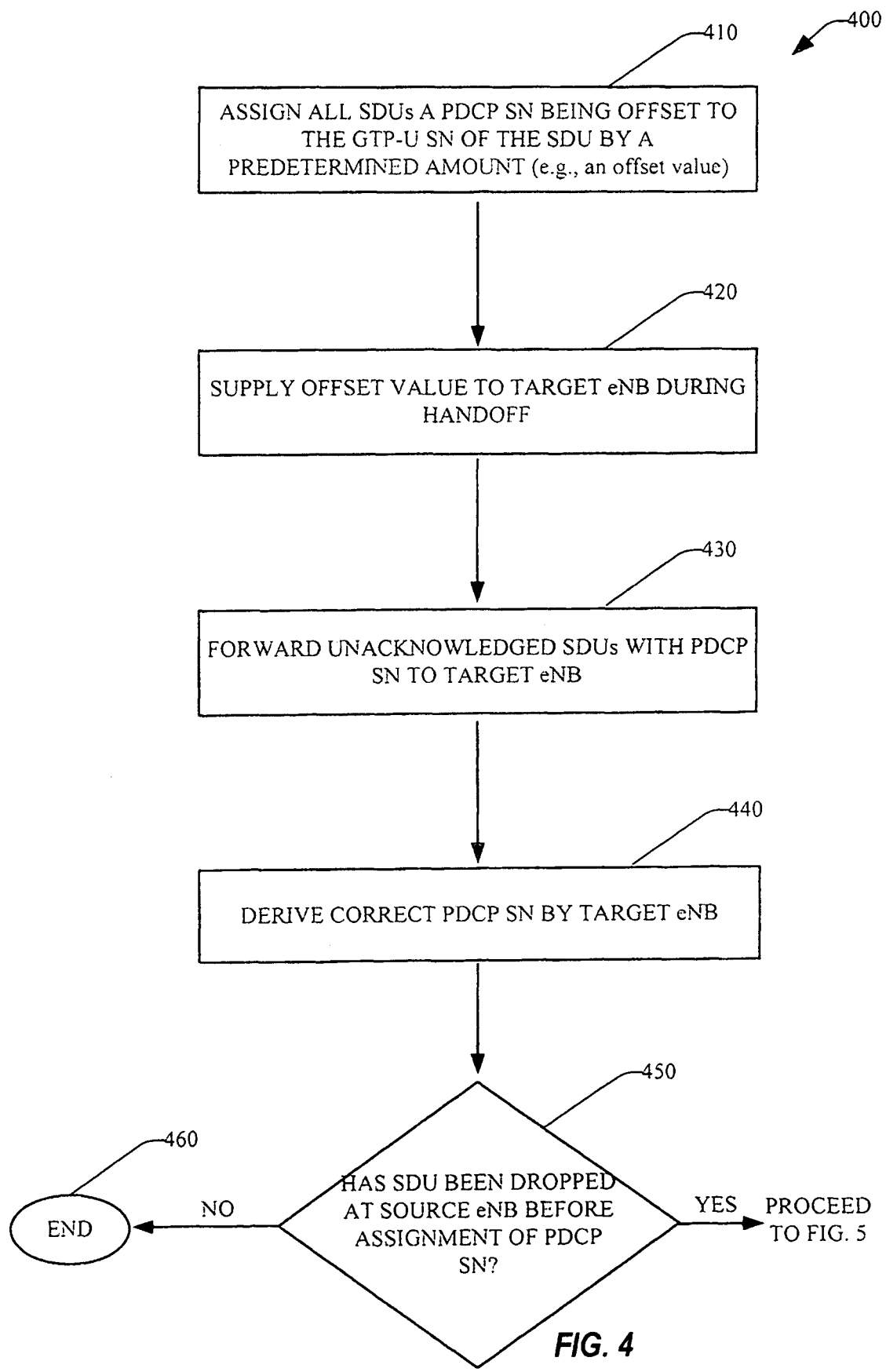
FIG. 4 illustrates a methodology for removal of a PDCP SN according to a further aspect.

FIG. 4 illustrates a related methodology 400 of managing PDCP SN gaps according to an aspect. In general, the methodology 400 ensures that all PDCP SDUs transferred on S1 are delivered in-order (regardless of HO). As such, a sequence number (GTP-U) is designated and assigned by the assigned by the SGW, which enables re-ordering the PDCP SDUs at the eNB. Initially, and at 410 the source eNB assigns all SDUs a PDCP SN that is offset to the GTP-U SN of the SDU by a fixed amount, which is indicative of the offset value. At 420, and during HO (e.g., in the HO Request Msg from the source eNB to the target eNB), the source eNB provides such offset value to the target eNB. Subsequently, and at 430 the source forwards all unacknowledged SDUs with a PDCP SN to the target eNB. Next and based on such offset, at 440 the target eNB derives the correct PDCP SN to employ on the SDUs coming from the new S1 based on their GTP-U SNs. The target eNB can send those SDUs coming from the new S1 as soon as they arrive at the target eNB (no timer to wait) even intermixed with any forwarded SDUs (fully utilizing the over-the-air bandwidth anytime). Subsequently, and at 450 a determination is made regarding whether an SDU is being dropped at the source eNB, (e.g., due to a timeout, staled in the buffer and the like)—before assignment of a PDCP SN. If not, the methodology ends at 460.

Figure 5:
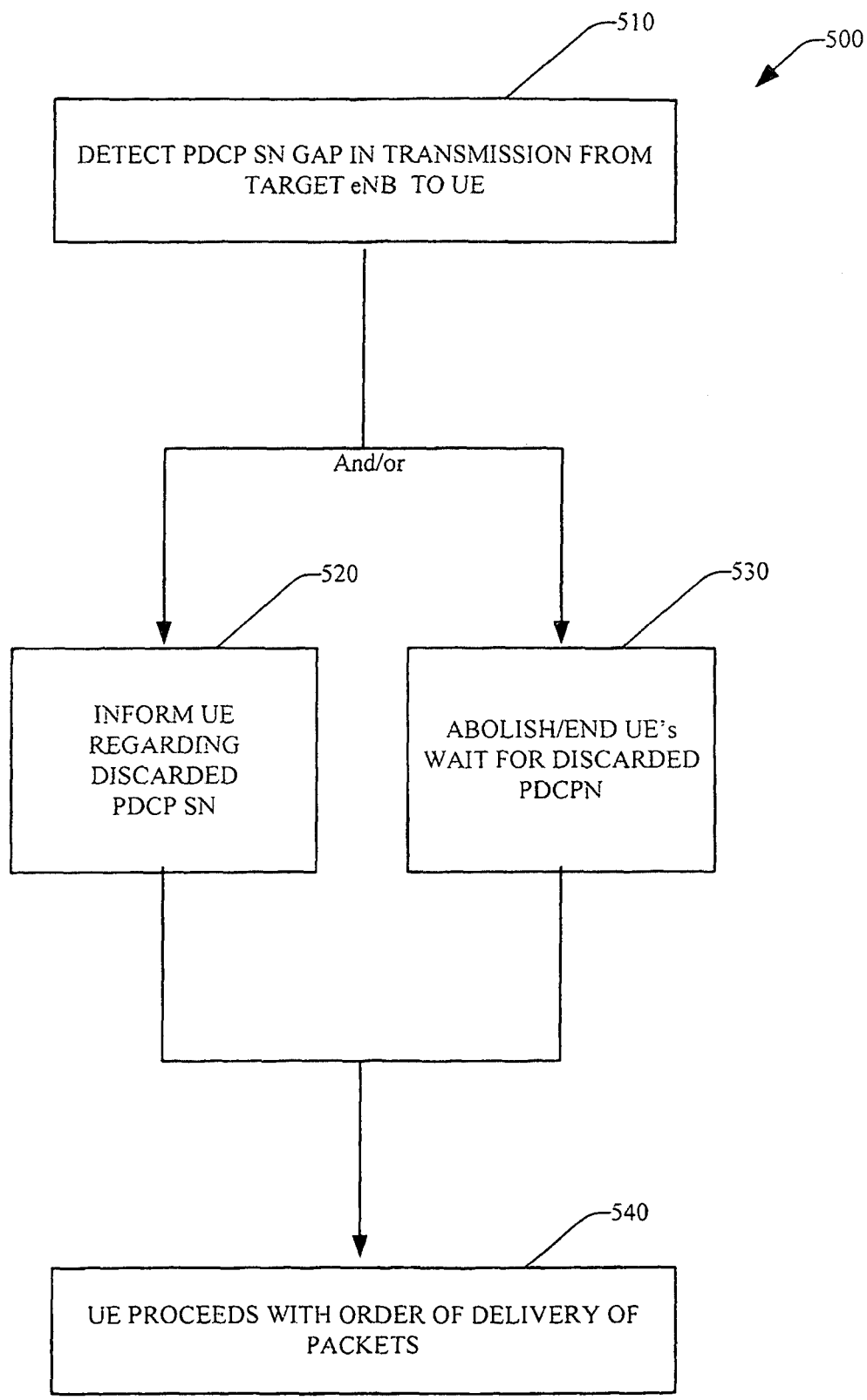
FIG. 5 illustrates a further methodology for managing PDCDP SN gaps as a result of dropping a PDCP SDU.

Otherwise, and if a determination is made regarding existence of gap in PDCP SN, the methodology proceeds to FIG. 5, wherein at 510 a detection can identify such gap in the PDCP SN being transmitted from the target eNB to the UE. Upon such detection, the methodology 500 can proceed to act 520 or to act 530 and/or a combination thereof. At 520, a notification from the target eNB informs the UE that the missing PDCP SN has been discarded. Likewise, at 530 the UE can abolish a wait for such PDCP SN, via an internal timer and a time out period. Such time out period designation can designate an amount of time that the UE awaits receipt of the PDCP N+2, for the example above. Subsequently, and at 540 the UE proceeds with the order of delivery requirements for delivery of the packets. Accordingly, when assigning all SDUs a PDCP SN—the uniqueness of sequence numbers assigned by the serving gateway to the packets can be exploited, and risk of offset changes related to a dropped SDU at the source eNB are managed efficiently. Such further maintains order for arrival for PDCP SDUs when a UE encounters a lost PDCP that has resulted from a dropped SDU at the source eNB—before assignment of a PDCP SN.

Figure 6:
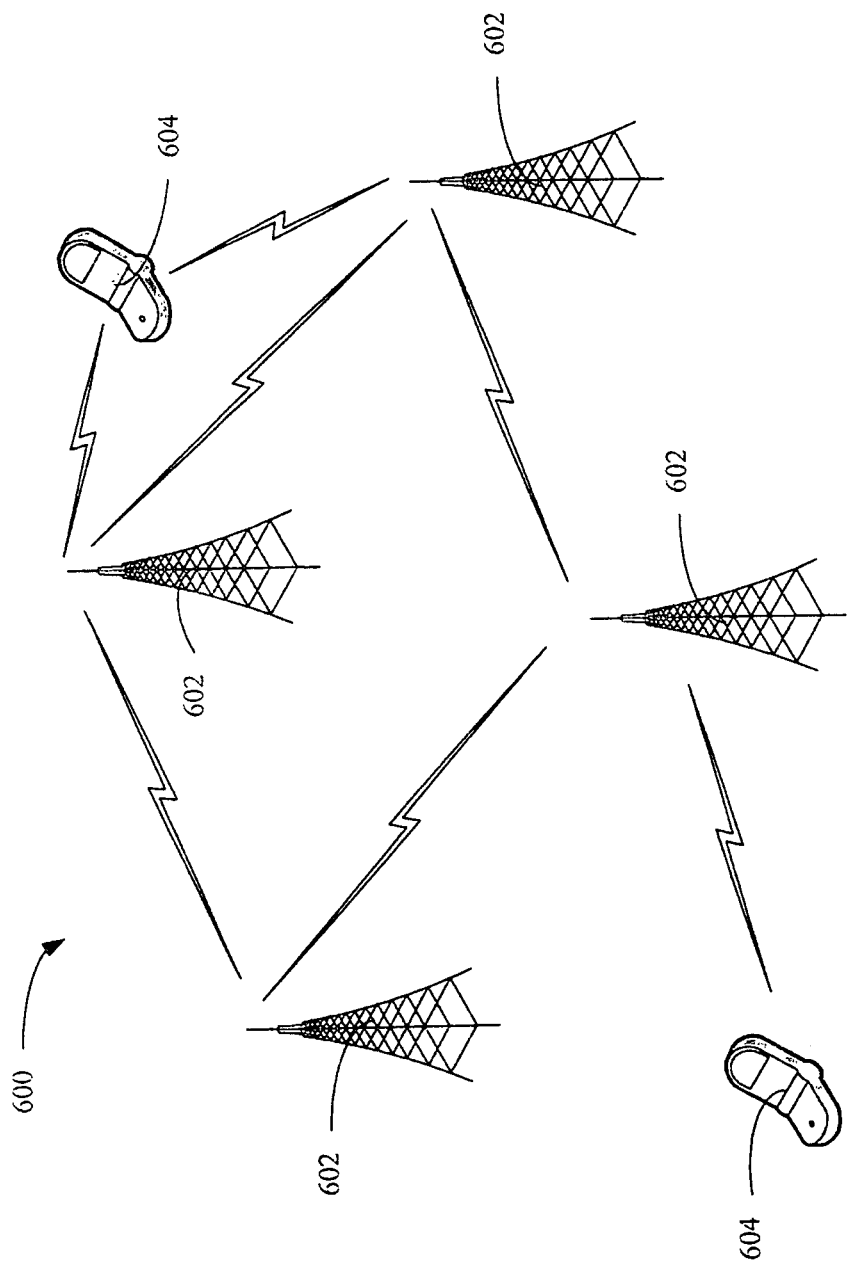
FIG. 6 illustrates a wireless communication according to an aspect of the subject innovation.

FIG. 6 illustrates a wireless communication system 600 in accordance with various aspects presented herein. System 600 can comprise one or more base stations 602 in one or more sectors that receive, transmit, repeat, and so forth, wireless communication signals to each other and/or to one or more mobile devices 604. Each base station 602 can comprise multiple transmitter chains and receiver chains (e.g., one for each transmit and receive antenna), each of which can in turn comprise a plurality of components associated with signal transmission and reception (e.g., processors, modulators, multiplexers, demodulators, demultiplexers, antennas, and so forth). Each mobile device 604 can comprise one or more transmitter chains and receiver chains, which can be utilized for a multiple input multiple output (MIMO) system. Each transmitter and receiver chain can comprise a plurality of components associated with signal transmission and reception (e.g., processors, modulators, multiplexers, demodulators, demultiplexers, antennas, and the like), as will be appreciated by one skilled in the art.

During a hand over form a base station to another base station the UE 604 or the mobile device reports the measurement of source eNB and signal strength to a source node. If the source eNB determines to perform a handover, a handover request is sent from the source eNB to the target eNB. As explained in detail supra, the source eNB can then indicate offset numbers (N) in the handover request. As such, the source eNB can apply an offset N (where N is an integer) to the sequence number of the serving gateway, wherein the source applies a PDCP sequence number having such offset N. Likewise, a serving gateway associated with the communication system 600 can designate the sequence number of the packets arriving from the serving gateway by assigning unique numbers, as GTP-USN.

Figure 7:
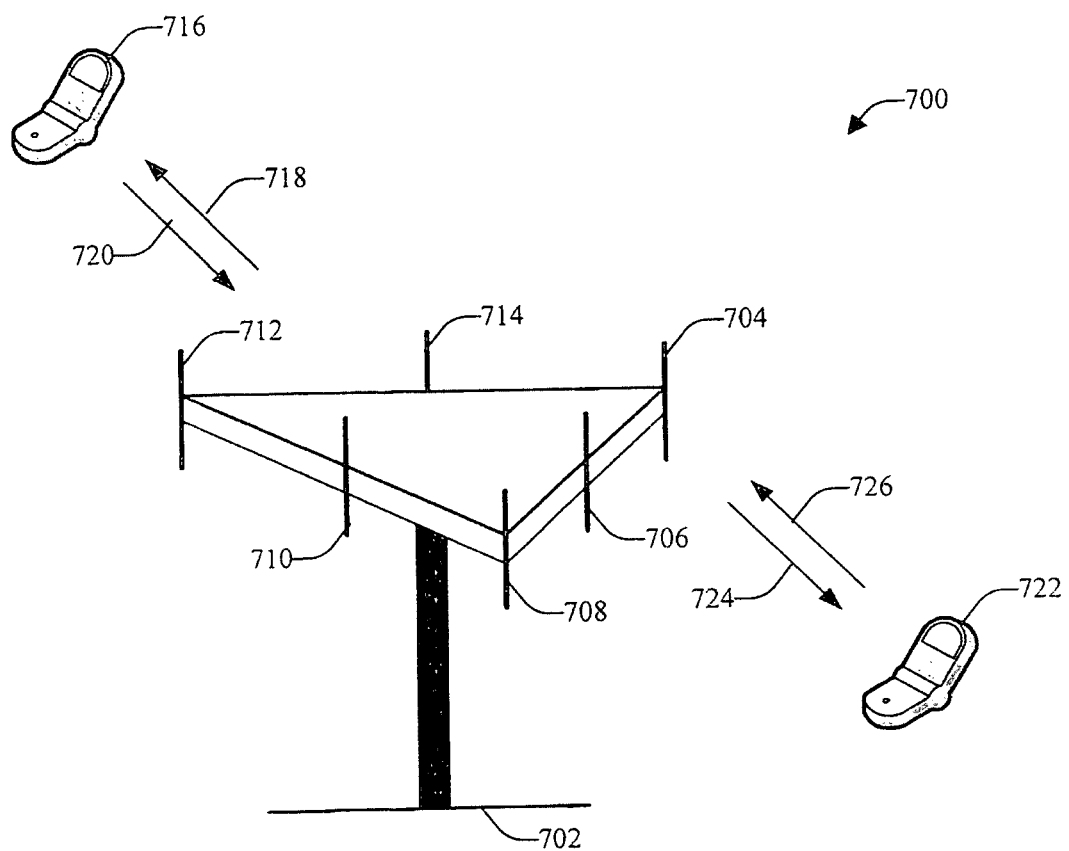
FIG. 7 illustrates a further wireless communication according to an additional aspect.

FIG. 7 illustrates a multiple access wireless communication system 700 according to one or more aspects is illustrated. A wireless communication system 700 can include one or more base stations in contact with one or more user devices. Each base station provides coverage for a plurality of sectors. A three-sector base station 702 is illustrated that includes multiple antenna groups, one including antennas 704 and 706, another including antennas 708 and 710, and a third including antennas 712 and 714. As illustrated in FIG. 7, only two antennas are shown for each antenna group, however, more or fewer antennas may be utilized for each antenna group. Mobile device 716 is in communication with antennas 712 and 714, where antennas 712 and 714 transmit information to mobile device 716 over forward link 718 and receive information from mobile device 716 over reverse link 720. Forward link (or downlink) refers to the communication link from the base stations to mobile devices, and the reverse link (or uplink) refers to the communication link from mobile devices to the base stations. Mobile device 722 is in communication with antennas 704 and 706, where antennas 704 and 706 transmit information to mobile device 722 over forward link 724 and receive information from mobile device 722 over reverse link 726. In a FDD system, for example, communication links might utilize different frequencies for communication. For example, forward link 718 might use a different frequency than the frequency utilized by reverse link 720.

Each group of antennas and/or the area in which they are designated to communicate may be referred to as a sector of base station 702. In one or more aspects, antenna groups each are designed to communicate to mobile devices in a sector or the areas covered by base station 702. A base station may be a fixed station used for communicating with the terminals.

In communication over forward links 718 and 724, the transmitting antennas of base station 702 can utilize beamforming in order to improve a signal-to-noise ratio of forward links for the different mobile devices 716 and 722. Also, a base station utilizing beamforming to transmit to mobile devices scattered randomly through its coverage area might cause less interference to mobile devices in neighboring cells than the interference that can be caused by a base station.

Figure 8:
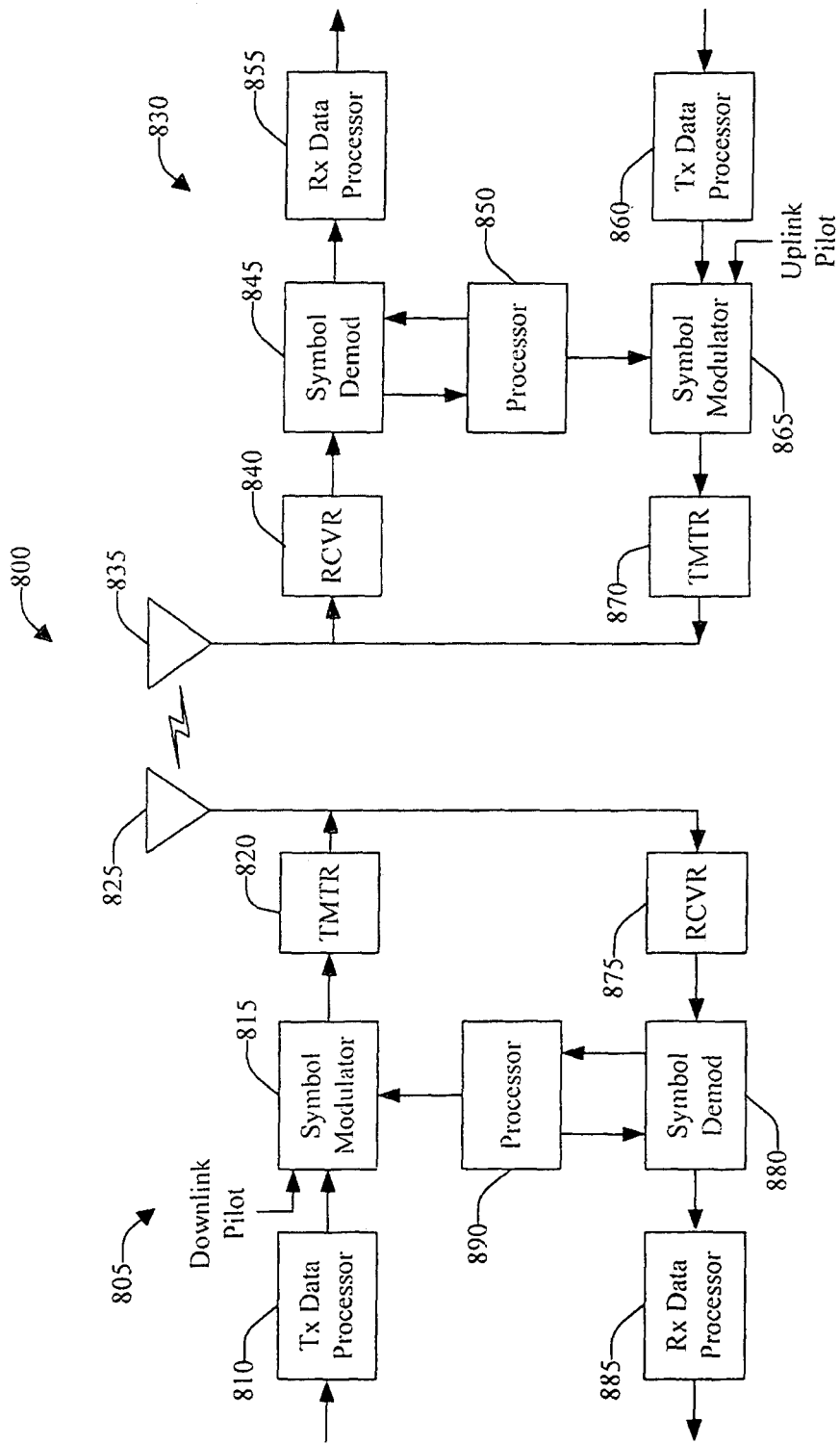
FIG. 8 illustrates a multiple access wireless communication system according to one or more aspects.

FIG. 8 illustrates an exemplary wireless communication system 800. Wireless communication system 800 depicts one base station and one terminal for sake of brevity. However, it is to be appreciated that system 800 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

As illustrated in FIG. 8, on a downlink, at access point 805, a transmit (TX) data processor 810 receives, formats, codes, interleaves, and modulates (or symbol maps) traffic data and provides modulation symbols ("data symbols"). A symbol modulator 815 receives and processes the data symbols and pilot symbols and provides a stream of symbols. A symbol modulator 815 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 820 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 825 to the terminals. At terminal 830, an antenna 835 receives the downlink signal and provides a received signal to a receiver unit (RCVR) 840. Receiver unit 840 conditions (e.g., filters, amplifies, and frequency downconverts) the received signal and digitizes the conditioned signal to obtain samples. A symbol demodulator 845 obtains N received symbols and provides received pilot symbols to a processor 850 for channel estimation. Symbol demodulator 845 further receives a frequency response estimate for the downlink from processor 850, performs data demodulation on the received data symbols to obtain data symbol estimates (which are estimates of the transmitted data symbols), and provides the data symbol estimates to an RX data processor 855, which demodulates (i.e., symbol demaps), deinterleaves, and decodes the data symbol estimates to recover the transmitted traffic data. The processing by symbol demodulator 845 and RX data processor 855 is complementary to the processing by symbol modulator 815 and TX data processor 810 respectively, at access point 805.

On the uplink, a TX data processor 860 processes traffic data and provides data symbols. A symbol modulator 865 receives and multiplexes the data symbols with pilot symbols, performs modulation, and provides a stream of symbols. A transmitter unit 870 then receives and processes the stream of symbols to generate an uplink signal, which is transmitted by the antenna 835 to the access point 805.

At access point 805, the uplink signal from terminal 830 is received by the antenna 825 and processed by a receiver unit 875 to obtain samples. A symbol demodulator 880 then processes the samples and provides received pilot symbols and data symbol estimates for the uplink. An RX data processor 885 processes the data symbol estimates to recover the traffic data transmitted by terminal 830. A processor 890 performs channel estimation for each active terminal transmitting on the uplink.

Processors 890 and 850 direct (e.g., control, coordinate, manage, . . . ) operation at access point 805 and terminal 830, respectively. Respective processors 890 and 850 can be associated with memory units (not shown) that store program codes and data. Processors 890 and 850 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 890 and 850.

Figure 9:
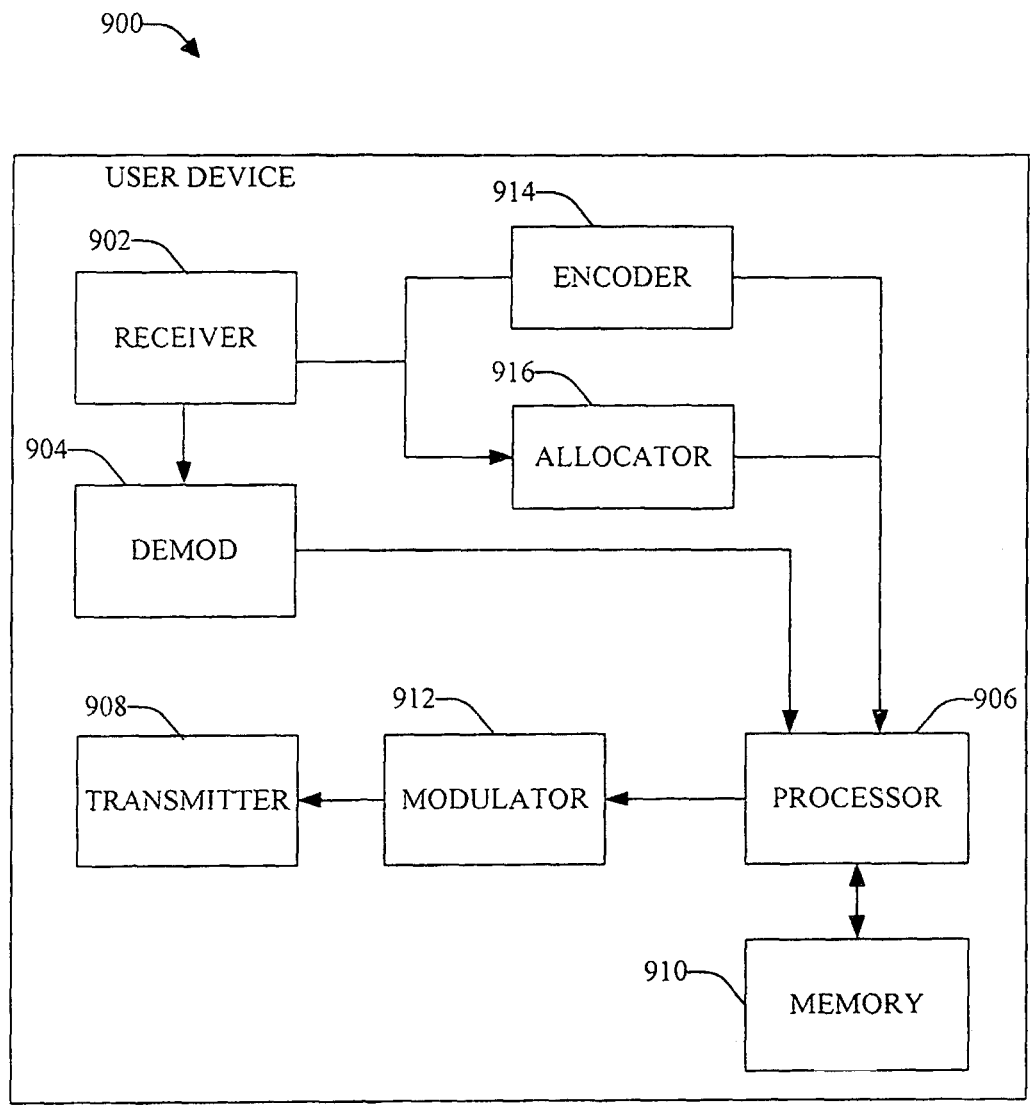
FIG. 9 illustrates a communication system that manages PDCP SN gaps according to a further aspect.

With reference now to FIG. 9, illustrated is a user device 900 that can encounter a lost PCDP from a dropped SDU at a source eNB, before assignment of a PDCP SN. System 900 comprises a receiver 902 that can receive a signal from, for example, a receiver antenna. The receiver 902 can perform typical actions thereon, such as filtering, amplifying, down converting, etc. the received signal. The receiver 902 can also digitize the conditioned signal to obtain samples. A demodulator 904 can obtain received symbols for each symbol period, as well as provide received symbols to a processor 906.

Processor 906 can be a processor dedicated to analyzing information received by receiver component 902 and/or generating information for transmission by a transmitter 908. In addition or alternatively, processor 906 can control one or more components of user device 900, analyze information received by receiver 902, generate information for transmission by transmitter 908, and/or control one or more components of user device 900. Processor 906 may include a controller component capable of coordinating communications with additional user devices.

User device 900 can additionally comprise memory 908 operatively coupled to processor 906 and that can store information related to coordinating communications and any other suitable information. Memory 910 can additionally store protocols associated with sample rearrangement. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and/or methods is intended to comprise, without being limited to, these and any other suitable types of memory. User device 900 can further comprise a symbol modulator 912 and a transmitter 908 that transmits the modulated signal.

Receiver 902 is further operatively coupled to an encoder 914 that scrambles a Walsh Sequence with a random sequence to produce a scrambled sequence. The encoder 914 can be provided with the random sequence so that a single FHT can be utilized to decode the sequence. Additionally, receiver 902 can be operatively coupled to an allocator 916 that receive an assignment of one or more sub-sequences of the scrambled sequence. The transmitter 908 can send the scrambled sequence as an access-based handoff probe. In response to the access probe, receiver 902 can receive an Access Grant, which can be transmitted over a Shared Signaling MAC Protocol.

Figure 10:
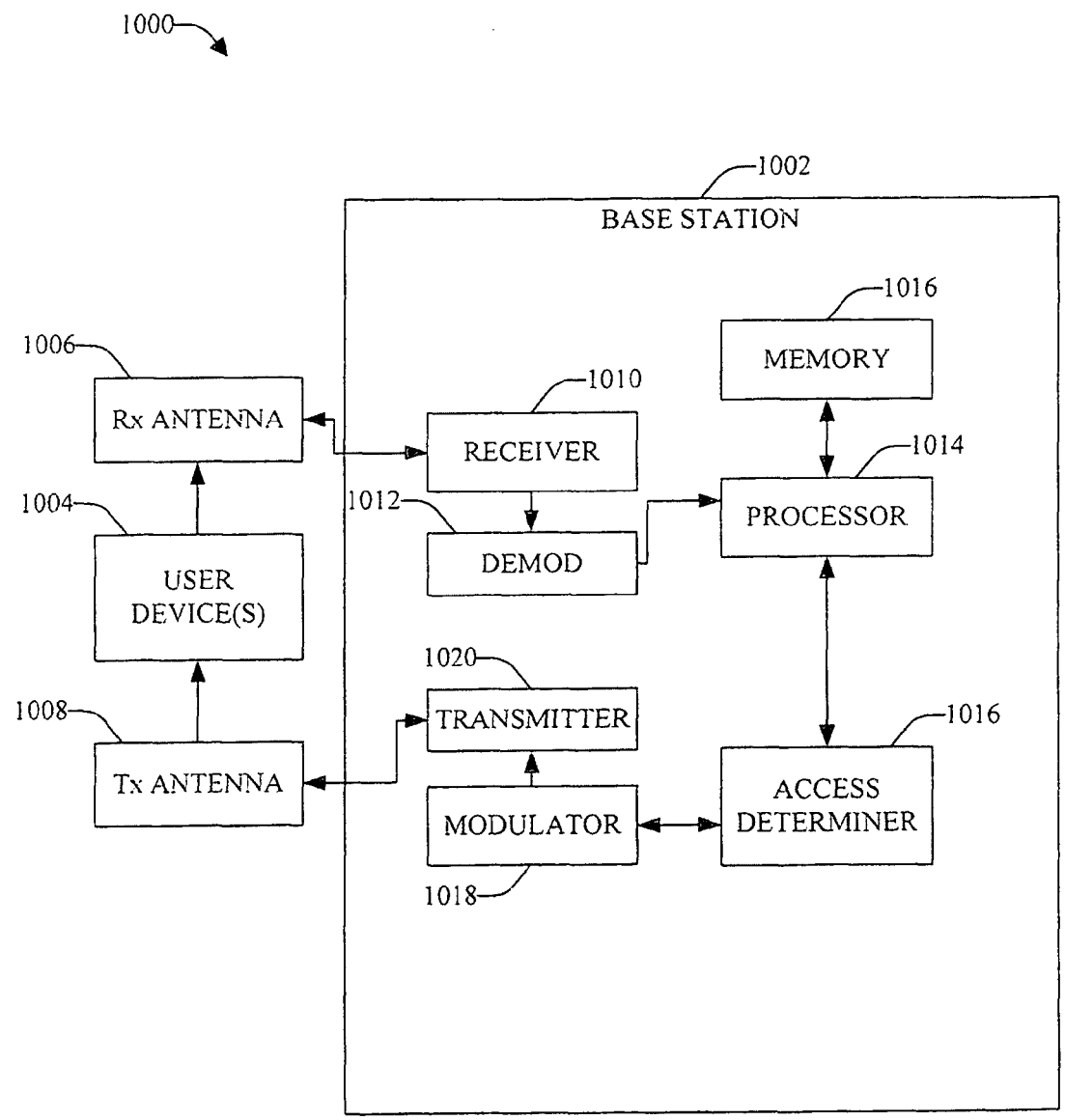
FIG. 10 illustrates a further communication system that mitigates risk of offset change, according to a further aspect.

FIG. 10 is an illustration of a system 1000 that facilitates maintaining order for arrival of PDCP SDUs. System 1000 comprises a base station or access point 1002. As illustrated, base station 1002 receives signal(s) from one or more user devices 1004 by a receive antenna 1006, and transmits to the one or more user devices 1004 through a transmit antenna 1008.

Base station 1002 comprises a receiver 1010 that receives information from receive antenna 1006 and is operatively associated with a demodulator 1012 that demodulates received information. Demodulated symbols are analyzed by a processor 1014 that is coupled to a memory 1016 that stores information related to broadcast-multicast waveforms embedded in a unicast waveform. A modulator 1018 can multiplex the signal for transmission by a transmitter 1020 through transmit antenna 1008 to user devices 1004.

Processor 1014 is further coupled to an access determiner 1016. Receiver 1010 can receive an access probe from one or more mobile devices that desire to gain access to a sector served by base station 1002. Demodulator 1012 can demodulate a Walsh Sequence included in the access probe utilizing an FHT. Access determiner 1016 can selectively Grant the one or more mobile devices access to the sector.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In one aspect, Logical Traffic Channels includes a Dedicated Traffic Channel (DTCH) that is Point-to-point bi-directional channel, dedicated to one UE, for the transfer of user information. Also, one can employ a Multicast Traffic Channel (MTCH) for Point-to-multipoint DL channel for transmitting traffic data.

In another aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprises a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)

The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

Figure 11:
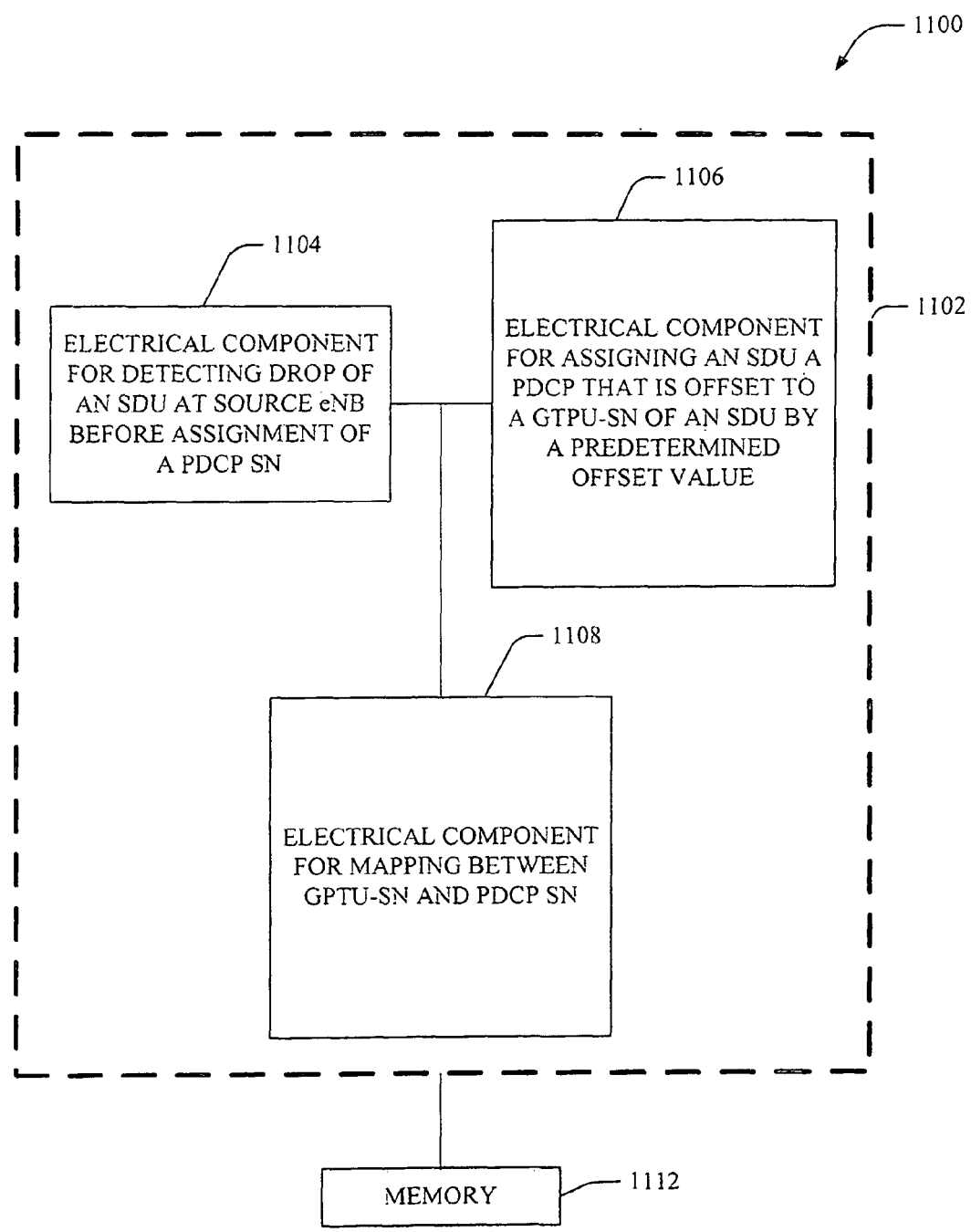
FIG. 11 is an illustration of a system that facilitates managing PDCP SN gaps during a hand over.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multmedia Broadcast Multicast Service
MCCHMBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper Field
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecomnuunications System
UTRA UMTS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel FIG. 11 illustrates a particular system 1100 that maintains order of arrival for PDCP SDUs during a hand over from a source eNB to a target eNB The system 1100 can be associated with an access point and includes a grouping 1102 of components that can communicate with one another in connection with a handover from a source eNB to a target eNB. Grouping 1102 also includes an electrical component 1106 for assigning an SDU a PDCP that is offset to a GPTU-SN of an SDU by a predetermined offset value. Moreover, grouping 1102 further includes an electrical component 1104 for detecting drop of an SDU at source eNB before assignment of a PDCP SN. Furthermore, a grouping 1108 includes electrical components for mapping between GPTU-SN and PDCP SN. System 1100 can also include a memory 1112, which can retain instructions relating to executing components 1104, 1106, 1108.

By initially assigning all SDUs a PDCP SN, a PDCP SN gap or hole can then be encountered upon dropping a PDCP SDU. To manage PDCP SN gaps or holes thus generated, an internal time out can be designated and an associated UE waits for such SN hole(s) to time out. Other aspects enable the source eNB to send a PDCP Status Message to the UE (via the target eNB) to abort the SN gaps or holes resulting from a dropped PDCP SN.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of maintaining order of arrival for packet data convergence protocol (PDCP) service data units (SDUs) during a hand over from a source evolved Node B (eNB) to a target eNB comprising:
    assigning a packet data convergence protocol sequence number (PDCP SN) to a service data unit (SDU), the PDCP SN being offset to a General Packet Radio Services tunneling protocol sequence number (GTP-U SN) for the SDU by a predetermined offset value;
    supplying the predetermined offset value to the target eNB during the hand over;
    detecting drop of a further SDU at the source eNB before assignment of an associated PDCP SN to the further SDU at the source eNB;
    informing, by the source eNB, a user equipment (UE) of the drop of the further SDU; and
    discarding the associated PDCP SN at the source eNB.

2. The method of claim 1 further comprising forwarding unacknowledged SDUs with PDCP SNs to the target eNB.

3. The method of claim 1 further comprising terminating a UE's stay for a discarded PDCP SN via a time out timer.

4. The method of claim 1 further comprising verifying whether a gap exists in order of PDCP SNs.

5. The method of claim 1 further comprising proceeding with order of delivery of packets by the UE.

6. The method of claim 1 further comprising deriving the PDCP SN by the target eNB via the predetermined offset value.

7. The method of claim 1 further comprising assigning the GTPU SN as a unique number by a serving gateway.

8. The method of claim 7 further comprising mapping between the GTP-U SN and the PDCP SN.

9. The method of claim 7 further comprising opening a new connection to the serving gateway by the target eNB and receiving PDCP sequence numbers from the source eNB.

10. A wireless communications apparatus, comprising: at least one processor configured to:
    designate for service data units (SDUs), packet data convergence protocol sequence numbers (PDCP SNs) that are offset to General Packet Radio Services tunneling protocol sequence numbers (GTP-U SNs) of the SDUs by a predetermined offset value;

verify drop of a service data unit (SDU) at a source evolved Node B (eNB) before assignment of an associated packet data convergence protocol sequence number (PDCP SN) to the dropped SDU at the source eNB;

supply the predetermined offset value to a target eNB;

inform, by the source eNB, a user equipment (UE) of the drop of the SDU; and discarding the associated PDCP SN at the source eNB.

11. The wireless communication apparatus of claim 10 the at least one processor further configured to forward an unacknowledged SDU with a corresponding PDCP SN to the target eNB.

12. The wireless communication apparatus of claim 11 the at least one processor further configured to terminate a UE's wait for PDCP SN via a time out timer.

13. The wireless communication apparatus of claim 11 the at least one processor further configured to verify an existences for a gap in order of PDCP SN.

14. The wireless communication apparatus of claim 11 the at least one processor further configured to map between the PDCP SNs and the GTP-U SNs.

15. The wireless communication apparatus of claim 11 the at least one processor further configured to prompt the UE to proceed with order of delivery of packets.

16. A wireless communication apparatus for maintaining order of arrival for packet data convergence protocol (PDCP) service data units (SDUs) during a hand over from a source evolved Node B (eNB) to a target eNB comprising:

means for assigning a service data unit (SDU) a PDCP sequence number (SN) that is offset to a General Packet Radio Services tunneling protocol (GTP-U) SN associated with the SDU by a predetermined offset value;

means for supplying the offset value to the target eNB during the hand over;

means for detecting drop of an additional SDU at the source eNB before assignment of an associated PDCP SN to the additional SDU at the source eNB;

means for informing, by the source eNB, a user equipment (UE) of the drop of the additional SDU; and means for discarding the associated PDCP SN at the source eNB.

17. The wireless communication apparatus of claim 16 further comprising means for assigning unique GTP-U SN numbers to packets.

18. The wireless communication apparatus of claim 16 further comprising means for mapping between the GTP-U SN and the PDCP SN.

19. A computer program product comprising:

a non-transitory computer-readable medium comprising:

code for causing at least one computer to designate for a service data unit (SDU) a packet data convergence protocol sequence number (PDCP SN) that is offset to a General Packet Radio Services tunneling protocol sequence number (GTP-U SN) associated with the SDU by a predetermined offset value;

code for detecting drop of an additional SDU at a source evolved Node B (eNB) before assignment of the associated PDCP SN to the additional SDU at the source eNB;

code for informing, by the source eNB, a user equipment (UE) of a drop of the additional SDU; and code for discarding the associated PDCP SN at the source eNB.

20. The computer program product of claim 19 further comprising code for causing the at least one computer to supply the predetermined offset value to a target eNB during a hand over.

21. The computer program product of claim 19 further comprising code for causing the at least one computer to forward unacknowledged SDUs with a PDCP SN to the target eNB.

22. The computer program product of claim 19 further comprising code for causing the at least one computer to discard the associated PDCP SN via a time out timer.

23. The computer program product of claim 19 further comprising code for causing the at least one computer to verify existence of a gap in order of PDCP SNs.

24. The computer program product of claim 19 further comprising code for causing the at least one computer to continue with order of delivery of packets by the UE.

25. The computer program product of claim 19 further comprising code for causing the at least one computer to derive PDCP SN by a target eNB via the predetermined offset value.

26. The computer program product of claim 19 further comprising code for causing the at least one computer to implement the GTP-U SN as a unique number by a serving gateway.

27. The computer program product of claim 19 further comprising code for causing the at least one computer to map between the GTP-U SN and the PDCP SN.

28. A method of maintaining order of arrival for packet data convergence protocol (PDCP) service data units (SDUs) during a hand over from a source evolved Node B (eNB) to a target eNB comprising:

receiving a packet data convergence protocol sequence number (PDCP SN) by a service data unit (SDU), the PDCP SN being offset to a General Packet Radio Services (GPRS) tunneling protocol sequence number (GTP-U SN) for the SDU by a predetermined offset value;

detecting drop of a further SDU at the source eNB before assignment of an associated PDCP SN to the further SDU at the source eNB;

notifying, by the source eNB, a user equipment (UE) of the drop of the further SDU; and discarding the associated PDCP SN at the source eNB.

29. The method of claim 28 further comprising supplying the predetermined offset value to the target eNB during the hand over.

30. The method of claim 28 further comprising verifying whether a hole exists in order of PDCP SNs.

31. The method of claim 28 further comprising deriving the PDCP SN by the target eNB via the predetermined offset value.

32. The method of claim 28 further comprising mapping between the GTP-U SN and the PDCP SN.

33. The method of claim 28 further comprising opening a new connection to the serving gateway by the target eNB.

34. The method of claim 33 further comprising receiving PDCP sequence numbers from the source eNB.

35. The method of claim 33 further comprising terminating a UE's wait for the associated PDCP SN.

* * * * *